(12) United States Patent
Binder et al.

(10) Patent No.: US 10,718,385 B2
(45) Date of Patent: Jul. 21, 2020

(54) GEAR SHIFT DEVICE FOR A MOTOR VEHICLE TRANSMISSION

(71) Applicant: HOERBIGER ANTRIEBSTECHNIK HOLDING GMBH, Schongau (DE)

(72) Inventors: Juergen Binder, Schongau (DE); Sami Oezkan, Murnau (DE); Peter Echtler, Schongau (DE); Andreas Dempfle, Eggenthal (DE); Philip Minkwitz, Pollingen (DE); Christopher Traut, Untermeitingen (DE); Tobias Schuler, Altenstadt (DE)

(73) Assignee: HOERBIGER ANTRIEBSTECHNIK HOLDING GMBH, Schongau (DE)

( * ) Notice: Subject to any disclaimer, the term of this patent is extended or adjusted under 35 U.S.C. 154(b) by 259 days.

(21) Appl. No.: 15/662,897

(22) Filed: Jul. 28, 2017

(65) Prior Publication Data
US 2018/0038420 A1 Feb. 8, 2018

(30) Foreign Application Priority Data
Aug. 2, 2016 (DE) .................. 10 2016 114 271

(51) Int. Cl.
*F16D 25/0638* (2006.01)
*F16D 23/04* (2006.01)
(Continued)

(52) U.S. Cl.
CPC ......... *F16D 25/0638* (2013.01); *F16D 23/04* (2013.01); *F16D 23/06* (2013.01);
(Continued)

(58) Field of Classification Search
CPC ............. F16D 25/0638; F16D 25/0632; F16D 23/025; F16D 23/04; F16D 2023/0643
See application file for complete search history.

(56) References Cited

U.S. PATENT DOCUMENTS

| 6,176,635 B1 | 1/2001 | Rank |
| 6,668,993 B2 | 12/2003 | Kwoka |
(Continued)

FOREIGN PATENT DOCUMENTS

| CN | 1485557 A | 3/2004 |
| CN | 1853052 A | 10/2006 |
(Continued)

*Primary Examiner* — Huan Le
(74) *Attorney, Agent, or Firm* — McNees Wallace & Nurick LLC

(57) ABSTRACT

The invention relates to a gear shift device for a motor vehicle transmission, comprising a first and a second gearbox component which are rotatable relative to each other around a gearbox axis, a friction ring which is connected to the first gearbox component comprising a conical frictional surface, a plurality of first disks and a plurality of second disks. The first and second disks form a multi-disk clutch, the first disks being coupled to a synchronization element in a rotationally fixed manner, and the synchronization element comprising, axially adjoining the conical frictional surface of the friction ring, a conical mating surface for speed synchronization between the first gearbox component and the first disks. Further, the first disks are designed as a synchronization disk where the synchronization element is integrally formed thereon and/or one of the first disks is designed as a disk support coupling all first disks in the circumferential direction in a form-locking manner.

13 Claims, 12 Drawing Sheets

(51) Int. Cl.
  *F16H 3/78* (2006.01)
  *F16D 23/06* (2006.01)
  *F16H 61/04* (2006.01)
  *F16H 61/684* (2006.01)
  *F16H 63/30* (2006.01)
  *F16H 3/66* (2006.01)

(52) U.S. Cl.
  CPC ............ *F16H 3/78* (2013.01); *F16H 61/0403* (2013.01); *F16H 61/684* (2013.01); *F16H 63/3026* (2013.01); *F16H 3/66* (2013.01); *F16H 2200/0065* (2013.01); *F16H 2200/2012* (2013.01); *F16H 2200/2046* (2013.01)

(56) References Cited

U.S. PATENT DOCUMENTS

| | | | |
|---|---|---|---|
| 7,108,115 B2 | 9/2006 | Ebenhoch et al. | |
| 7,357,235 B2 | 4/2008 | Schmidt et al. | |
| 7,445,103 B2 | 11/2008 | Fink et al. | |
| 2002/0144563 A1 | 10/2002 | Forsyth | |
| 2003/0132082 A1 | 7/2003 | Kwoka | |
| 2004/0055844 A1* | 3/2004 | Ebenhoch | F16D 23/06 |
| | | | 192/53.1 |
| 2006/0163020 A1 | 7/2006 | Schmidt et al. | |
| 2006/0201268 A1 | 9/2006 | Fink et al. | |
| 2008/0029332 A1 | 2/2008 | Gokan et al. | |
| 2016/0146268 A1 | 5/2016 | Damm et al. | |
| 2017/0016486 A1* | 1/2017 | Damm | F16D 13/32 |

FOREIGN PATENT DOCUMENTS

| | | |
|---|---|---|
| CN | 201651116 U | 11/2010 |
| CN | 101979898 A | 2/2011 |
| DE | 10101407 C1 | 6/2002 |
| DE | 10244523 A1 | 4/2004 |
| DE | 10331370 A1 | 3/2005 |
| DE | 102014117194 A1 | 5/2016 |
| EP | 0 940 596 A2 | 3/1999 |

\* cited by examiner

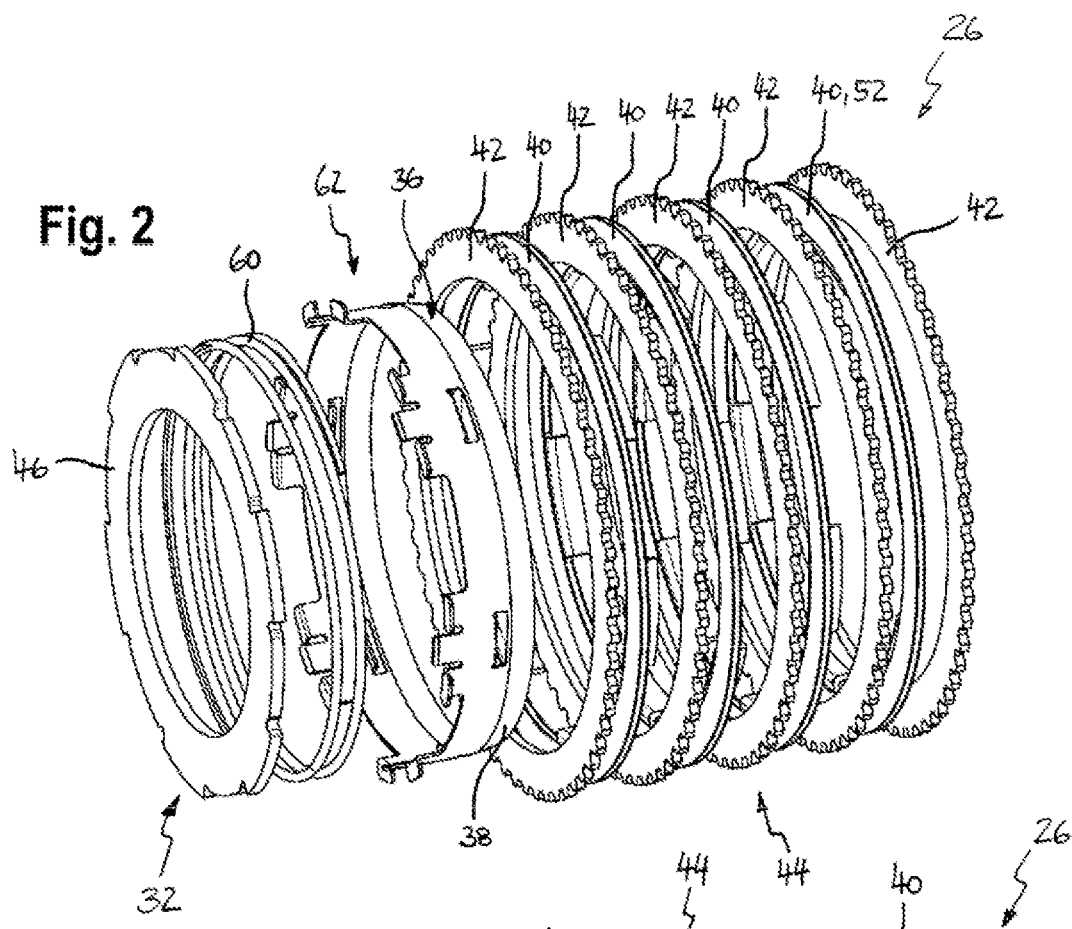
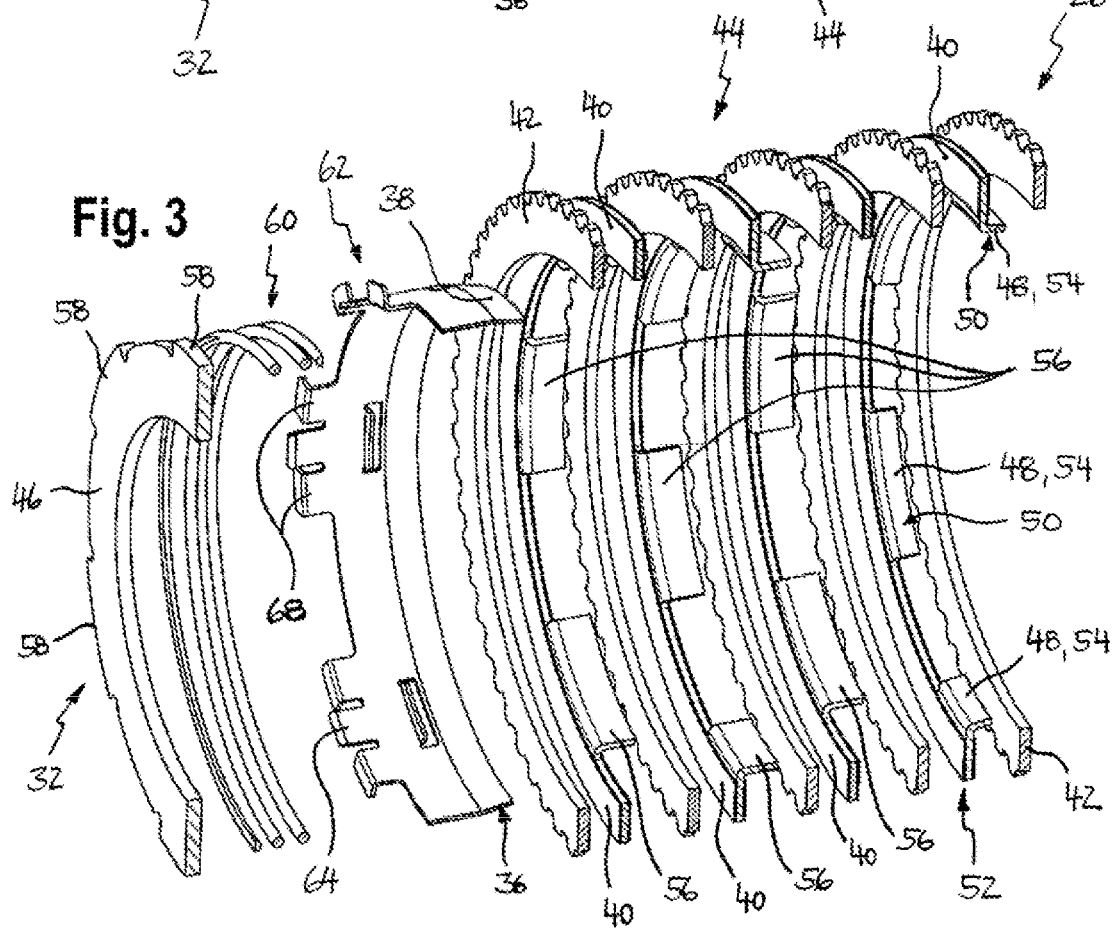

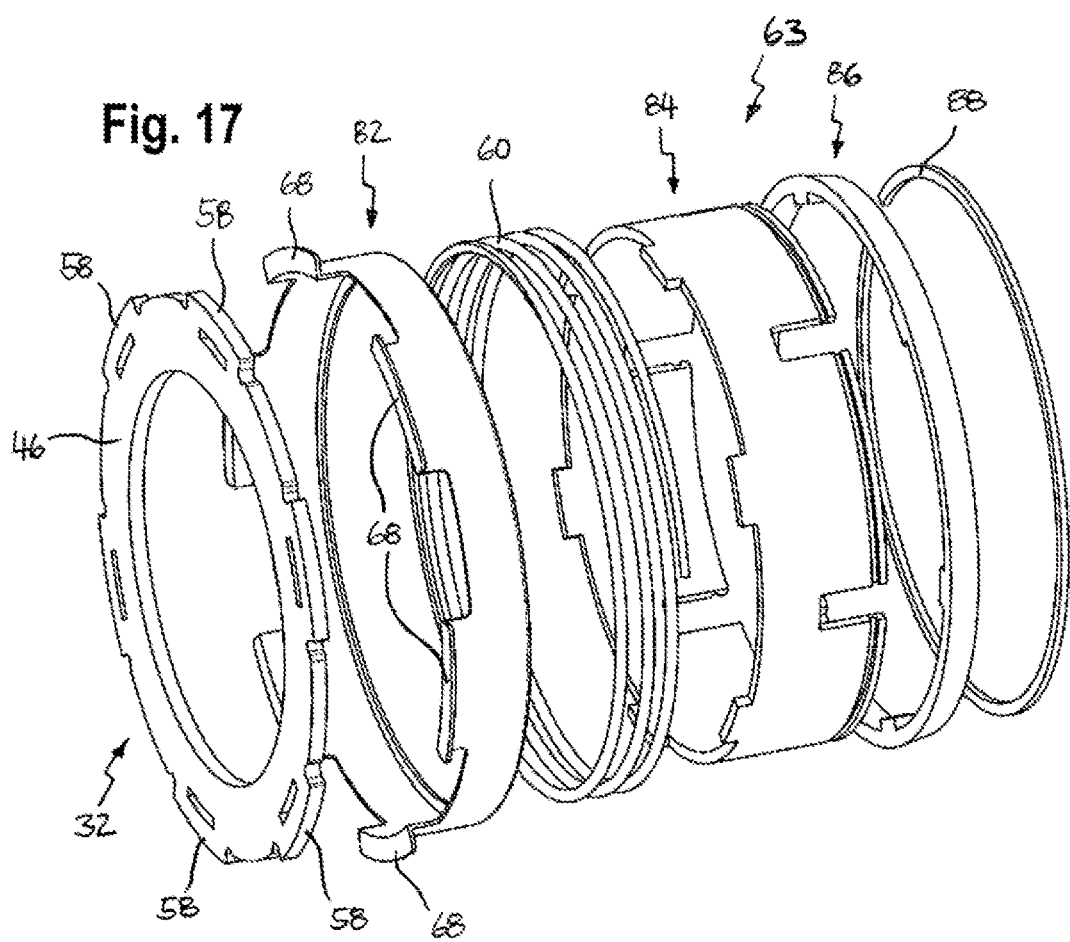

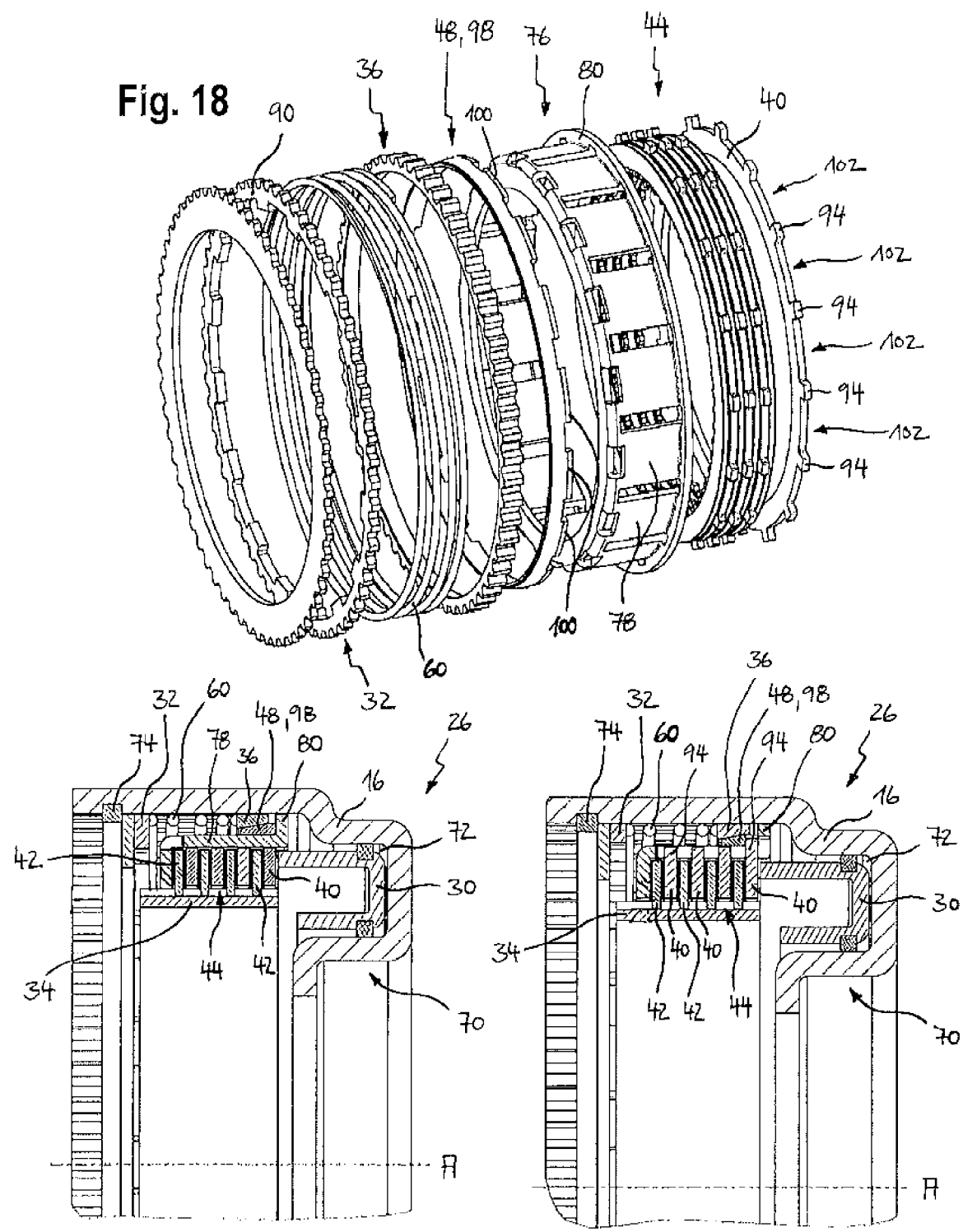

GEAR SHIFT DEVICE FOR A MOTOR VEHICLE TRANSMISSION

FIELD OF THE INVENTION

The invention relates to a gear shift device for a motor vehicle transmission, in particular a fully automatic stepped transmission.

BACKGROUND

For the transmission of power, also automatic transmissions, in particular stepped fully automatic transmissions comprising a hydrodynamic torque converter and planetary transmissions are used in the automotive engineering apart from manually shifted change speed transmissions.

Such fully automatic stepped transmissions act as a power shift transmission which work without any interruption of the tractive force, with the power flow occurring via planetary gear sets and the gear changes being established by coupling or releasing individual planetary gear set elements. The process of coupling individual planetary gear set elements is currently performed in most cases by means of multi-disk clutches which have to be designed for a maximum torque to be transmitted and comprise a correspondingly high number of frictional points or disks for torque transmission. Due to the numerous frictional points, the undesired drag torques in the uncoupled state are quite high and have a detrimental effect on the gear efficiency.

For this reason, the generic DE 102 44 523 A1 already proposes a vehicular transmission in which the inner disk support is coupled to a rotatable gearbox component, e.g. a gearbox shaft, via a synchronization. The synchronization selectively allows a decoupling, a frictional or a form-locking coupling of the inner disk supports with the rotatable gearbox component. It is also in the uncoupled state of the synchronization that drag torques occur, but these are much smaller due to the frictional surfaces being substantially smaller as compared to a multi-disk clutch. In the uncoupled state of the gear shift device, i.e. when the multi-disk clutch is opened and the synchronization is uncoupled, a relative rotation occurs due to the lower drag torques exclusively or at least mainly within the area of the synchronization and does not exist at all or scarcely in the area of the multi-disk clutch, so that the gear efficiency is increased.

The construction of the vehicular transmission disclosed in DE 102 44 523 A1, however, is relatively complex due to the large number of individual components as well as three separate springs for axially acting upon these individual components and further comprises an undesirably high gear shift force level.

It is the object of the invention to minimize the number of the individual components and to provide a constructionally simple gear shift device for a motor vehicle transmission, which contributes to a high gear efficiency due to low drag torques.

SUMMARY

The present invention provides a gear shift device for a motor vehicle transmission, in particular a fully automatic stepped transmission, comprising a first gearbox component and a second gearbox component which are rotatable relative to each other around a gearbox axis, a friction ring which is connected to the first gearbox component so as to be rotationally fixed therewith in the circumferential direction and axially displaceable thereto and comprises a conical frictional surface, a plurality of first disks which are connected to one another so as to be rotationally fixed in the circumferential direction and axially displaceable relative to one another, and a plurality of second disks which are connected to one another so as to be rotationally fixed in the circumferential direction and axially displaceable relative to one another and are connected to the second gearbox component, the first and second disks being alternately arranged one behind the other and forming a multi-disk clutch, the first disks being coupled to a synchronization element in a rotationally fixed manner, and the synchronization element comprising, axially adjoining the conical frictional surface of the friction ring, a conical mating surface for speed synchronization between the first gearbox component and the first disks by a gear shift device of the type initially mentioned, in which one of the first disks is designed as a synchronization disk where the synchronization element is integrally formed thereon and/or one of the first disks is designed as a disk support coupling all first disks in the circumferential direction in a form-locking manner. The measure of integrally forming the synchronization element on one of the first disks and/or designing one of the first disks as a disk support allows a particularly simple and compact construction of the gear shift device which has a comparably low number of individual components and in which one of the first disks has its radially inner side provided with an integrally formed, bent portion which takes over a different function, namely to define the frictional surface for a synchronization element or to serve as a disk support for other disks.

According to one embodiment of the gear shift device, the first gearbox component forms a gearbox shaft capable of rotating around the gearbox axis or is firmly connected to such gearbox shaft, whereas the second gearbox component forms a further gearbox shaft capable of rotating around the gearbox axis or is firmly connected to such further gearbox shaft. In particular, the two separate gearbox shafts are coaxially arranged gearbox shafts of different planetary gear sets, which may be subjected to a speed harmonization by means of the gear shift device.

According to an alternative embodiment of the gear shift device, the first gearbox component or the second gearbox component forms a gearbox shaft capable of rotating around the gearbox axis or is firmly connected to such gearbox shaft, whereas the other gearbox component forms a rotationally fixed gearbox housing or is firmly connected to such gearbox housing. The gear shift device acts as a brake here, which is capable of braking the rotatable gearbox shaft and arrest it on the housing in a rotationally fixed manner. The multi-disk clutch constitutes a disk brake in the strict sense.

The synchronization disk may comprise a ring-shaped disk plate as well as frictional protrusions which are spaced in the circumferential direction, each frictional protrusion forming a synchronization element having a conical mating surface and being formed on a radial edge of the disk plate. This allows to produce the synchronization disk with low production expenditure as a reshaped sheet metal disk.

As an alternative, it is also conceivable that the synchronization element is a separate synchronizer ring which is axially urged against one of the first disks and rests against it, in particular the synchronizer ring comprising axial coupling protrusions which are provided for a rotationally fixed coupling with the first disk and engage in corresponding recesses of the first disk.

An actuating member is provided for axially acting upon the first and second disks, the actuating member being axially movable starting from a non-actuated initial position via a synchronization position and a form-locking position toward a coupled position, the multi-disk clutch being opened and the first disks being not coupled in the circumferential direction with the first gearbox component in the non-actuated initial position, the multi-disk clutch being substantially opened and the first disks being coupled in the circumferential direction via a frictional connection with the first gearbox component in the synchronization position, the multi-disk clutch being substantially opened and the first disks being coupled in the circumferential direction via a form-locking connection with the first gearbox component in the form-locking position, and the multi-disk clutch being closed and the first disks being coupled in the circumferential direction via a form-locking connection with the first gearbox component in the coupled position. As a consequence, the process of shifting the gear shift device requires only one single actuating member which—with a short shifting travel by closing the multi-disk clutch—brings about a synchronization between the first gearbox component and the first disks first and then ensures a frictional connection of the first and second gearbox component in the circumferential direction.

In this case, the synchronization disk is preferably the one of the first disks which is arranged to be axially closest to the actuating member. Upon axially acting upon the multi-disk clutch by the actuating member, it can be ensured in this way with low expenditure that a speed synchronization takes place between the first gearbox component and the first disks before the multi-disk clutch is closed.

According to an embodiment of the gear shift device, each of the first disks, except for the synchronization disk, has its radial disk edge provided with coupling protrusions which are spaced in the circumferential direction, the coupling protrusions extending in axial direction and each engaging an intermediate space of two coupling protrusions, adjacent in the circumferential direction, of the axially neighboring first disk. In this way, in each case two neighboring first disks are connected to each other in a rotationally fixed manner, so that a series connection is realized as a whole, coupling all first disks in a rotationally fixed manner to each other.

In this embodiment of the gear shift device, in the form-locking position and the coupled position of the actuating member, the coupling protrusions of the first disk which is axially furthest from the actuating member may engage in recesses of the first gearbox component in order to establish a rotationally fixed form-locking connection between the first disks and the first gearbox component.

According to an alternative embodiment of the gear shift device, the first disk which is axially furthest from the actuating member is configured as a disk support for a rotationally fixed form-fitting interconnection of all first disks.

In this embodiment, the first disk configured as a disk support may comprise a ring-shaped disk plate, a radial edge of the disk plate having coupling lugs formed thereon which are spaced in the circumferential direction and are axially bent, said coupling lugs being connected to one another by a stabilization ring at an end facing away from the disk plate. The stabilization ring results in a particularly high load bearing and torque transmission capacity of the multi-disk clutch.

Further, the coupling lugs of the first disk configured as a disk support may be in engagement in recesses of the first gearbox component in the form-locking position and the coupled position of the actuating member in order to provide a rotationally fixed form-locking connection between the first disks and the first gearbox component.

According to an embodiment of the gear shift device, a spring element is provided which urges the conical frictional surface of the friction ring axially toward the conical mating surface of the synchronization element. In this context, the first gearbox component, the friction ring and the spring element constitute in particular an axially pre-loaded, pre-mounted structural unit.

By way of example, the friction ring may be formed on a first axial end of a sheet metal sleeve, the sheet metal sleeve at an opposite second axial end comprising elastic latching elements for establishing a latching connection with the first gearbox component. This integration of the friction ring in a sheet metal sleeve results in an extremely compact design and a particularly low number of required individual components for the gear shift device.

The spring element is supported in this case preferably by the first gearbox component as well as by bent spring mounting lugs of the sheet metal sleeve.

Further, the first gearbox component can be a clutch disk comprising claws protruding radially outwards, the second axial end of the sheet metal sleeve having sheet metal lugs formed thereon which extend between neighboring claws of the clutch disk and connect the friction ring to the clutch disk in a rotationally fixed manner. The sheet metal sleeve hence represents an advantageous multifunctional component which comprises a conical frictional surface for speed synchronization, sheet metal lugs for bringing about a rotationally fixed connection with the first gearbox component and, where appropriate, spring mounting lugs for supporting a spring element.

BRIEF DESCRIPTION OF THE DRAWINGS

FIG. 2 is a perspective exploded view of a gear shift device of the invention according to one embodiment;

FIG. 3 is a partially sectional, perspective exploded view of the gear shift device according to FIG. 2;

FIG. 17 is a perspective exploded view of a pre-mounted assembly unit of the gear shift device according to FIG. 15;

FIG. 18 is a perspective exploded view of a gear shift device of the invention according to a further embodiment;

FIG. 19 shows a longitudinal section through the assembled gear shift device according to FIG. 18 in a non-actuated initial position;

FIG. 20 shows a further longitudinal section through the assembled gear shift device according to FIG. 18 in a non-actuated initial position;

DETAILED DESCRIPTION

Figure 1:
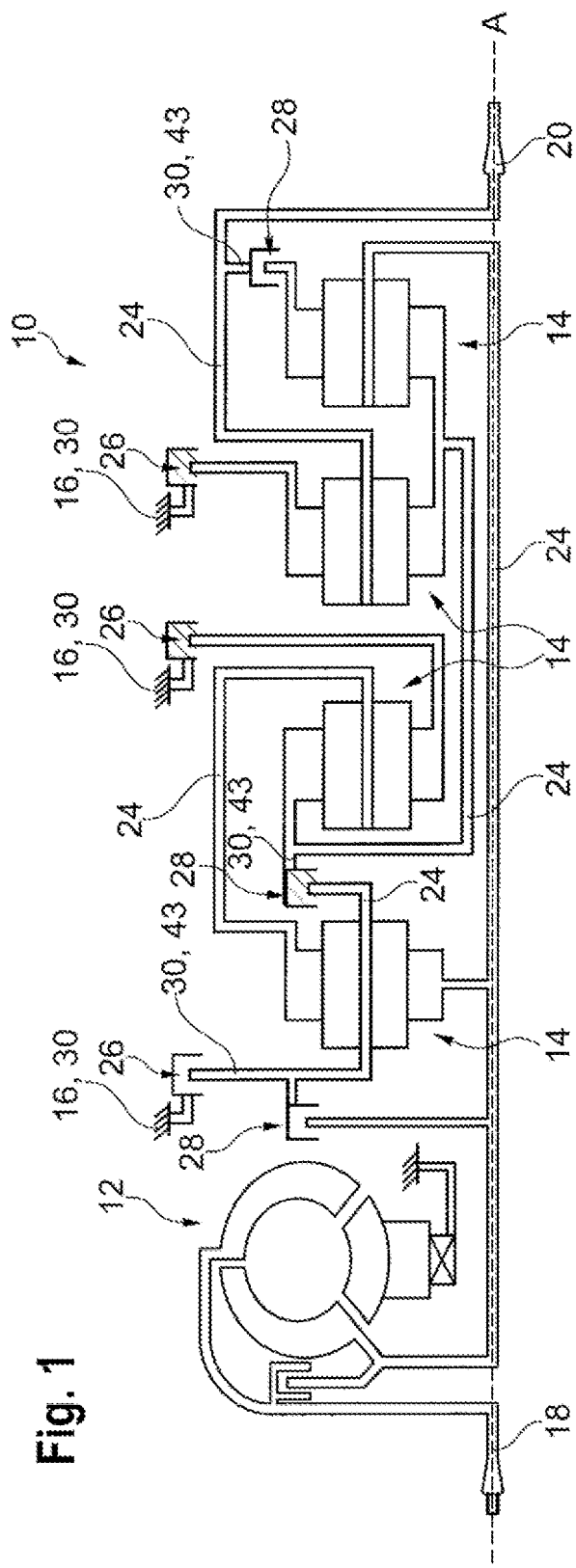
FIG. 1 shows a transmission scheme of a fully automatic stepped transmission comprising a gear shift device according to the invention.

FIG. 1 shows an electrohydraulically controlled, fully automatic stepped transmission 10 of a motor vehicle comprising a torque converter 12, four planetary transmissions or planetary gear sets 14 as well as a schematically indicated gearbox housing 16. Further provided are a drive shaft 18, an output shaft 20 as well as a plurality of gearbox shafts 24, with planetary gear supports, sun gears and internal gears of the planetary transmission also being referred to as gearbox shafts 24 in the following. The gearbox shafts 24 are associated to the individual planetary gear sets 14 and are arranged to be coaxial relative to one another.

The stepped transmission 10 further comprises gear shift devices 26, 28 which can be acted upon with hydraulic pressure and are able to either couple a gearbox shaft 24 to a further gearbox shaft 24 or to the gearbox housing 16 or uncouple the gearbox shaft 24 from the further gearbox shaft 24 or the gearbox housing 16.

In this context, a gear shift device 26 coupling the gearbox shaft 24 to the gearbox housing 16 is also referred to as a braking device, and a gear shift device 28 coupling two gearbox shafts 24 with each other is also referred to as a clutch device. In the present exemplary embodiment, six gear shift devices 26, 28 are provided among which three gear shift devices 26 are designed as a braking device and three gear shift devices 28 are designed as a clutch device. By way of example, two braking devices and one clutch device are in the coupled state (indicated by a hatched area) and one braking device and two clutch devices are in the uncoupled state according to FIG. 1.

The individual gear steps of the stepped transmission 10 corresponding to transmission ratios between the drive shaft 18 and the output shaft 20 result from various gear-shift combinations of the gear shift devices 26, 28.

As the basic construction and way of functioning of fully automatic stepped transmissions 10 is generally known from prior art already, there is no further description thereof and only the structural design and the function of the gear shift devices 26, 28 according to the invention will be described in detail below.

Figure 9:
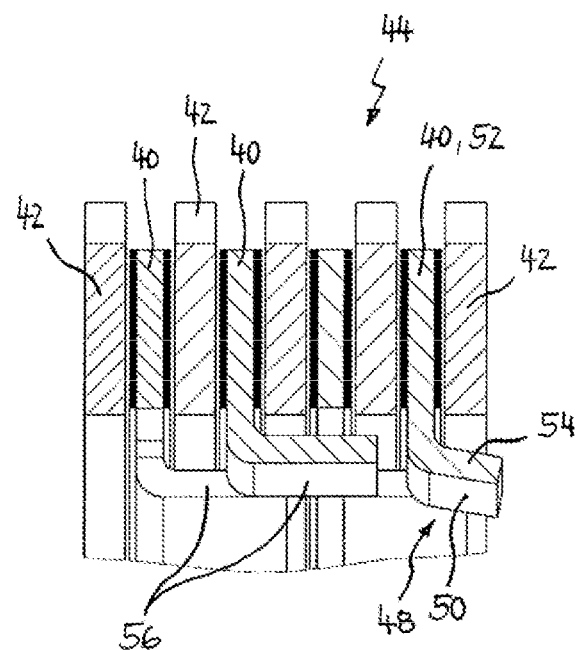
FIG. 9 shows a detail section through the multi-disk clutch of the gear shift device according to FIG. 2.
Figure 10:
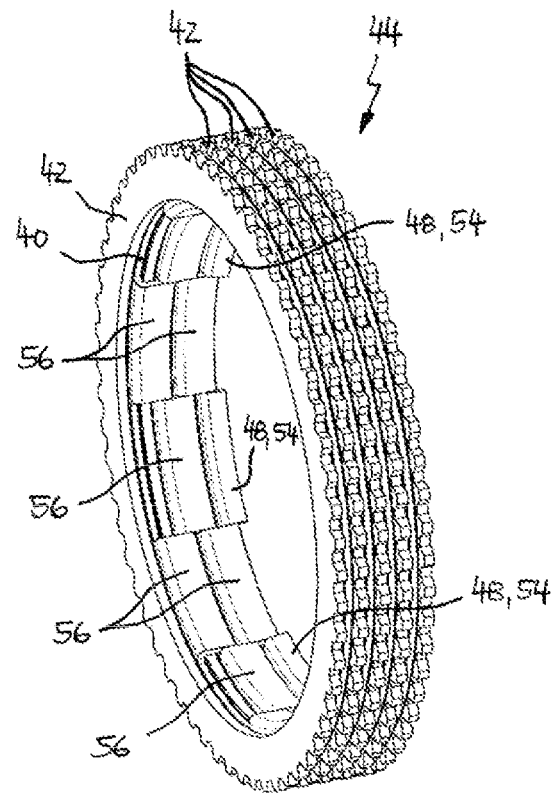
FIG. 10 is a perspective view of the multi-disk clutch according to FIG. 9.
Figure 11:
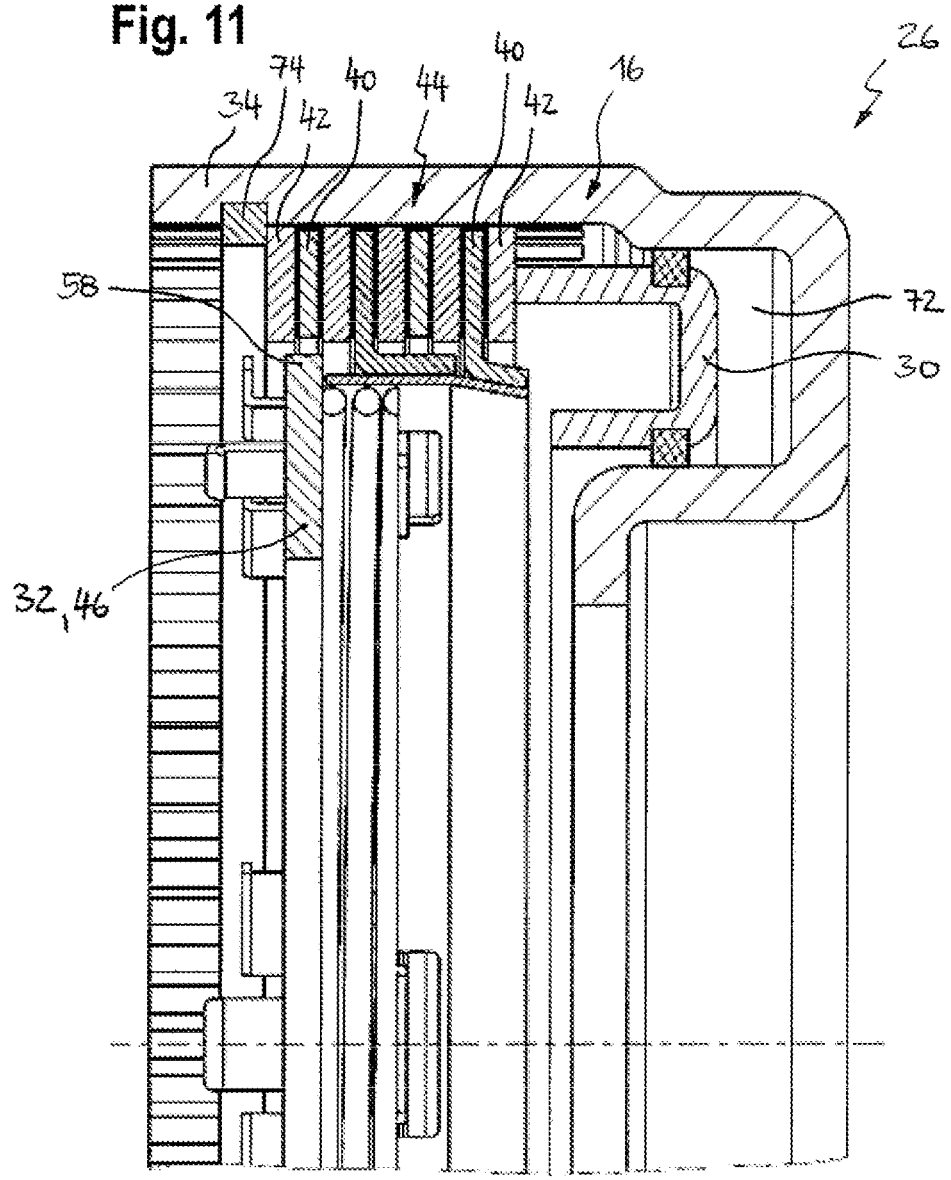
FIG. 11 shows a longitudinal section through the gear shift device according to FIG. 2 in a coupled position.

FIGS. 2 to 11 show an embodiment of the gear shift device 26 of a motor vehicle transmission, especially a fully automatic stepped transmission 10, with the gear shift device 26—in particular an actuating member 30 of the gear shift device 26—being capable of assuming various axial positions, to be more precise an axial initial position (FIGS. 4 to 6), an axial synchronization position, an axial form-locking position as well as an axial coupled position (FIG. 11).

The gear shift device 26 comprises a first gearbox component 32 and a second gearbox component 34 which are rotatable relative to each other around a gearbox axis A, a friction ring 36 which is connected to the first gearbox component 32 so as to be rotationally fixed therewith in the circumferential direction and axially displaceable thereto and comprises a conical frictional surface 38, a plurality of first disks 40 which are connected to one another so as to be rotationally fixed in the circumferential direction and axially displaceable, and a plurality of second disks 42 which are connected to one another so as to be rotationally fixed in the circumferential direction and axially displaceable and are connected to the second gearbox component 34, the first and second disks 40, 42 being alternately arranged one behind the other and forming a multi-disk clutch 44.

In the exemplary embodiment according to FIGS. 2 to 11, the first disks 40 are inner disks connected at a radially inner side in a rotationally fixed and axially displaceable manner, with the way of coupling the first disks 40 in the circumferential direction being described in more detail below. Accordingly, the second disks 42 are outer disks which each are connected to the second gearbox component 34 so as to be rotationally fixed and axially displaceable thereto, the latter being implemented as an outer disk support.

In the exemplary embodiment according to FIGS. 2 to 11, the first gearbox component 32 is a clutch disk 46 which is firmly connected to a gearbox shaft 24 of the stepped transmission 10 or even realized in one piece with it. On the other hand, the second gearbox component 34 is designed as a rotationally fixed gearbox housing 16 or firmly connected to such gearbox housing 16. Accordingly, the gear shift device 26 acts as a braking device and is able to lock the gearbox shaft 24 which is firmly connected to the clutch disk 46 on the gearbox housing 16.

Instead of being fixedly connected to the gearbox housing 16, the second gearbox component 34 may alternatively be designed as a further gearbox shaft 24 or may be firmly connected to such further gearbox shaft 24. Said further gearbox shaft 24 firmly connected to the second gearbox component 34 and said gearbox shaft 24 firmly connected to the first gearbox component 32 are explicitly two distinct, separate gearbox shafts 24 of different planetary gear sets 14, which are arranged in particular in coaxial manner. Such a gear shift device 28 correspondingly acts as a clutch device which is capable of coupling the gearbox shaft 24 of a planetary gear set 14 to the gearbox shaft 24 of another planetary gear set 14 via a multi-disk clutch 44 and a synchronization in the direction of rotation. In this process, a speed harmonization between the first disks 40 and the first gearbox component 32 will occur at first, before the gearbox shafts 24 are connected substantially in a rotationally fixed manner via a frictional fit connection of the multi-disk clutch 44 and a form-locking connection of the synchronization.

The synchronization between the first disks 40 and the clutch disk 46 which is firmly connected to the gearbox shaft 24 is provided in order to reduce the relatively high drag torques in the multi-disk clutch 44 occurring whenever the multi-disk clutch 44 is opened.

To this end, the first disks 40 are coupled to a synchronization element 48 in a rotationally fixed manner, the synchronization element 48 comprising—axially adjoining the conical frictional surface 38 of the friction ring 36—a conical mating surface 50 for speed synchronization between the first gearbox component 32 and the first disks 40.

FIGS. 3, 4, 9 and 11 clearly show that one of the first disks 40 is designed as a synchronization disk 52 where the synchronization element 48 is integrally formed thereon.

The synchronization disk 52 comprises a ring-shaped disk plate which extends in a plane perpendicular to the gearbox axis A, as well as frictional protrusions 54 which are spaced in the circumferential direction; each frictional protrusion 54 forms a synchronization element 48 having a conical mating surface 50 and is formed on a radially inner edge of the disk plate.

Figure 4:
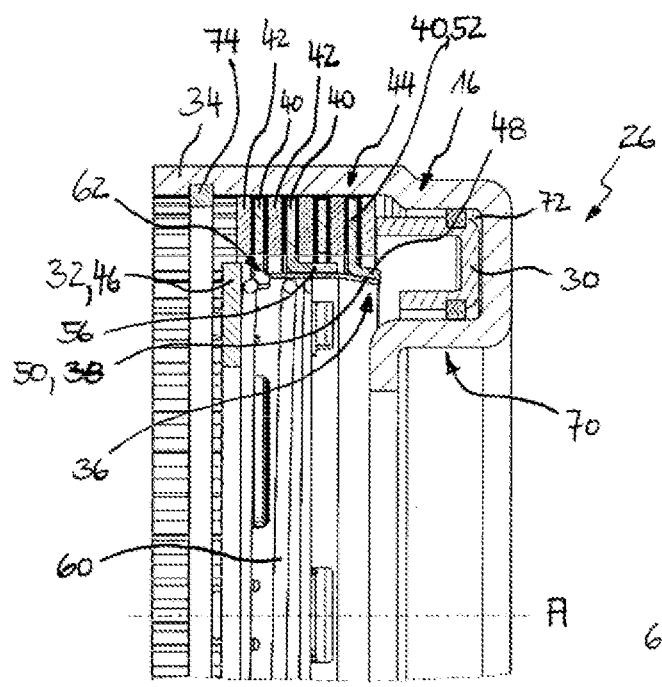
FIG. 4 shows a longitudinal section through the assembled gear shift device according to FIG. 2 in a non-actuated initial position.

In order to ensure a reliable synchronization prior to closing the multi-disk clutch 44, the synchronization disk 52 is arranged in axial direction as close as possible to the actuating member 30. It is particularly preferred that the synchronization disk 52 is the one of the first disks 40 which is axially closest to the actuating member 30, as illustrated in FIGS. 4 and 11.

According to FIGS. 9 and 10, each of the first disks 40, except for the synchronization disk 52, has its radially inner disk edge provided with coupling protrusions 56 which are spaced in the circumferential direction, the coupling protrusions 56 extending in axial direction and each engaging an intermediate space of two coupling protrusions 56, adjacent in the circumferential direction, of the axially neighboring first disk 40. In this way, each two neighboring first disks 40 are connected to each other in a rotationally fixed manner, so that as a whole a series connection is achieved by means of which all first disks 40 are coupled to one another in a rotationally fixed manner.

FIG. 10 clearly shows that the frictional protrusions 54 of the synchronization disk 52 have the same distribution and dimension in the circumferential direction than the coupling protrusions 56 of the other first disks 40. Thus, also the synchronization disk 52 can be easily coupled to the other first disks 40 substantially in a rotationally fixed manner in the circumferential direction via the coupling protrusions 56 of the axially neighboring first disk 40 by means of a form fit.

The described form-fitting interconnection of the first disks 40 in the circumferential direction allows in an advantageous way to do without a separate disk support for the first disks 40. This simplifies the construction of the gear shift device 26 and the number of the individual components is advantageously reduced.

Incidentally, the coupling protrusions 56 of the first disk 40 which is axially farthest from the actuating member 30 are also utilized to produce a rotationally fixed form-locking connection between the first disks 40 coupled in the circumferential direction and the first gearbox component 32. According to FIGS. 3 and 8, the first gearbox component 32 is designed as a clutch disk 46 comprising claws 58 protruding radially outwards, the coupling protrusions 56 of the first disk 40 which is axially farthest from the actuating member 30 engaging between the claws 58 in the form-locking position and coupled position of the actuating member 30 (see FIG. 11) and establishing a rotationally fixed form-locking connection with the gearbox shaft 24 via the clutch disk 46.

Figure 5:
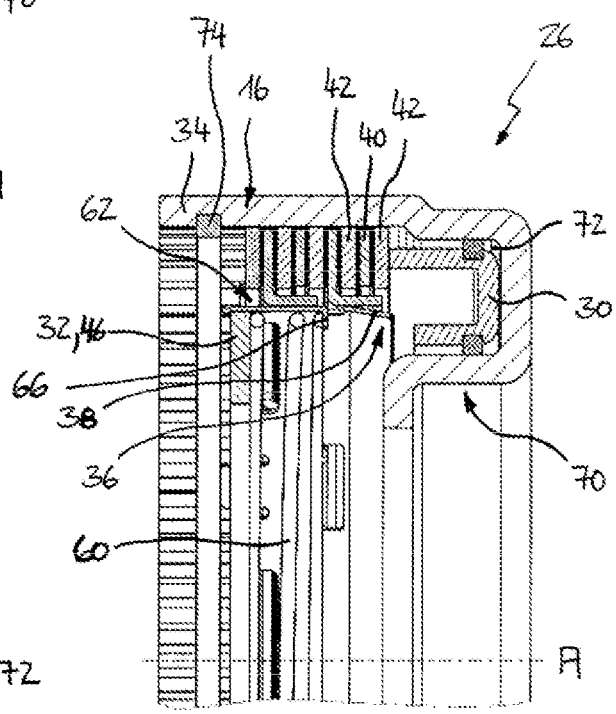
FIG. 5 shows a further longitudinal section through the assembled gear shift device according to FIG. 2 in the non-actuated initial position.
Figure 6:
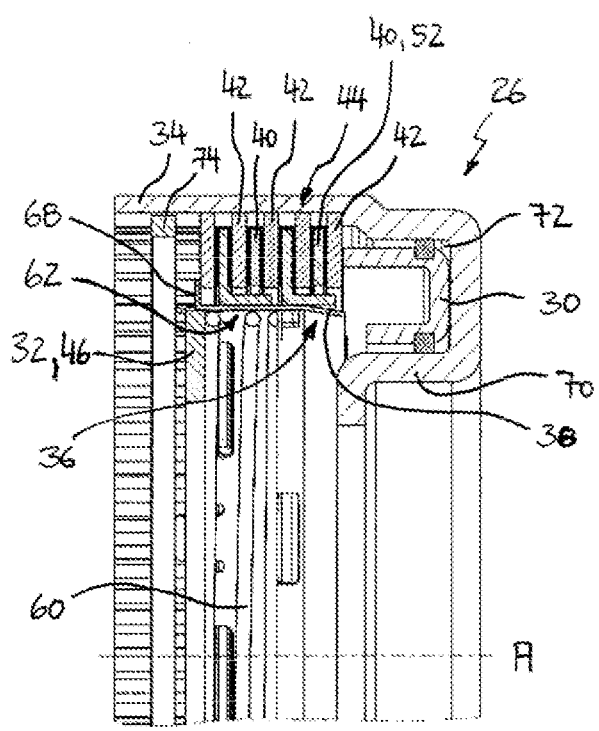
FIG. 6 shows a yet further longitudinal section through the assembled gear shift device according to FIG. 2 in the non-actuated initial position.

According to FIGS. 4 to 6, the gear shift device 26 further comprises a spring element 60 which urges the conical frictional surface 38 of the friction ring 36 axially toward the conical mating surface 50 of the synchronization element 48.

In the embodiment according to FIGS. 2 to 11, the friction ring 36 is formed on a first axial end of a sheet metal sleeve 62, the sheet metal sleeve 62 at an opposite second axial end comprising elastic latching elements 64 for establishing a latching connection with the first gearbox component 32. The spring element 60 is supported in the axial direction, on the one hand, by the first gearbox component 32 and, on the other, by bent spring mounting lugs 66 of the sheet metal sleeve 62 (see FIGS. 5 and 7), the spring mounting lugs 66 being tongues which are worked out from the sheet metal sleeve 62 by stamping and are angled radially inward.

Figure 8:
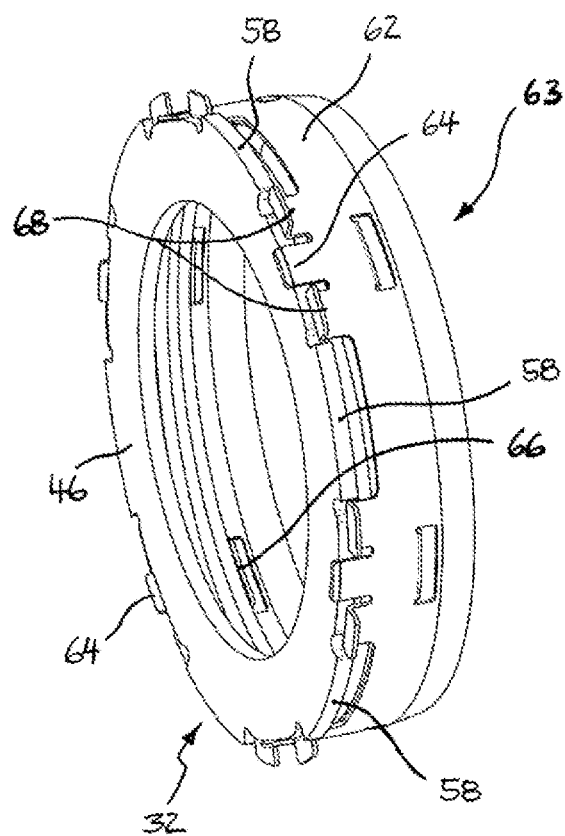
FIG. 8 is a perspective view of the pre-mounted structural unit according to FIG. 7.

In this way, the first gearbox component 32, the spring element 60 and the friction ring 36 or sheet metal sleeve 62 form an axially biased, pre-mounted structural unit 63, as it is illustrated in FIG. 8.

If the friction ring 36 is axially acted upon by the actuating member 30 via the synchronization element 48 of the synchronization disk 52, the sheet metal sleeve 62 can move against an axial force of the spring element 60 toward the first gearbox component 32. Consequently, the size of the synchronous torque between the frictional surface 38 and the mating surface 50 is limited by the axial spring force of the spring element 60.

Moreover, FIG. 8 clearly shows that the second axial end of the sheet metal sleeve 62 has sheet metal lugs 68 formed thereon which extend between neighboring claws 58 of the clutch disk 46, so that the friction ring 36 is connected to the gearbox shaft 24 in a rotationally fixed manner via the clutch disk 46 in all axial gear-shift positions of the actuating member 30.

The way of functioning of the gear shift device 26 is described in the following on the basis of the non-actuated initial position of the actuating member 30 shown in FIGS. 4 to 6.

In the illustrated exemplary embodiment, the gear shift device 26 is part of an electrohydraulically controlled, fully automatic stepped transmission 10, so that the actuating member 30 can be acted upon by the pressure of a hydraulic fluid, for influencing the rotation of the clutch disk 46 and the gearbox shaft 24.

It goes without saying that instead of a hydraulic actuation an electromotive actuation of the gear shift device 26 is also conceivable.

According to FIGS. 4 to 6, the second gearbox component 34 comprises a cylindrical portion 70. Further, the actuating member 30 is realized as a piston which is guided in the cylindrical portion 70 in an axially displaceable manner. The cylindrical portion 70 and the actuating member 30 designed as a piston define a pressurizable ring-shaped chamber 72 for axially displacing the piston.

According to FIGS. 4 to 6, the actuating member 30 moves to the left with an increasing pressure of the hydraulic fluid. In order to return the actuating member 30 to the right, a (not illustrated) spring may be provided, for instance, which urges the actuating member 30 into its illustrated axial initial position. As an alternative, it is also conceivable that the actuating member 30 is returned by hydraulic ways and means.

In the non-actuated, axial initial position of the actuating member 30 according to FIGS. 4 to 6, the friction ring 36 and the synchronization element 48 are in a so-called release position in which the frictional surface 38 is spaced from the mating surface 50. Consequently, the first disks 40 are not coupled to the first gearbox component 32 in the circumferential direction.

Moreover, in the non-actuated initial position of the actuating member 30, the axially adjoining first and second disks 40, 42 are released as well, i.e. are axially spaced from one another. This means that the multi-disk clutch 44 is opened.

In the release position of the synchronization, a drag torque occurs in the event of a speed difference between the first gearbox component 32 and the second gearbox component 34, which however is significantly lower than the drag torque of the opened multi-disk clutch 44 due to the much smaller frictional surface. Hence, a relative rotation in the initial position of the gear shift device 26 occurs exclusively or at least mainly within the synchronization between the friction ring 36 and the synchronization element 48. The first disks 40 move synchronously or at least mainly synchronously with the second disks 42 due to the drag torques existing in the (opened) multi-disk clutch 44, so that only the smaller drag torque of the synchronization arises in the initial position of the gear shift device 26, having a positive effect on the gear efficiency.

As a consequence of a beginning pressurization of the chamber 72, the actuating member 30 moves to the left into an axial synchronization position and—via the adjoining, axially outer second disk 42—acts upon the synchronization disk 52 and thus the conical mating surface 50 of the synchronization element 48 against the conical frictional surface 38 of the friction ring 36. The contact between the two conical surfaces brings about a synchronization, i.e. a speed harmonization between the first disks 40 and the friction ring 36 or the first gearbox component 32 connected to the friction ring 36 in a rotationally fixed manner.

Due to the axial force of the spring element 60, the released multi-disk clutch 44 is not closed. There is only a frictional moment between the disk plate of the synchronization disk 52 and the second disk 42 axially arranged between the synchronization disk 52 and the actuating member 30. Due to the cone enhancement between the conical frictional surface 38 and the conical mating surface 50, the frictional moment which is generated here dominates over the frictional moment in the planar frictional surface between the synchronization disk 52 and the second disk 42 axially adjoining the actuating member 30, whereby the speed of all first disks 40 is synchronized to the speed of the first gearbox component 32. The level of the synchronous torque is limited here by the axial force of the spring element 60.

Upon an increase of the hydraulic pressure in the chamber 72, the first disks 40 and the second disks 42 of the multi-disk clutch 44 are axially shifted toward the clutch disk 46 until the coupling protrusions 56 of the first disk 40 which is axially farthest from the actuating member 30 engage the gaps of the claws 58 of the clutch disk 46 to establish a rotationally fixed form-locking connection between the first disks 40 and the first gearbox component 32.

If the form-locking connection is established but the multi-disk clutch 44 is still mainly opened, the actuating member 30 is in its axial form-locking position.

If the coupling protrusions 56 of the first disk 40 which is axially farthest from the actuating member 30 cannot be brought into engagement directly between the claws 58 with the clutch disk 46 because the coupling protrusions 56 are axially adjacent to the claws 58, the multi-disk clutch 44 is partially closed at least temporarily due to the hydraulic pressure in the chamber 72, whereby the frictional moment in the multi-disk clutch 44 increases. Due to said increased frictional moment, there occurs a differential speed between the first disks 40 and the first gearbox component 32, allowing the coupling protrusions 56 to lock in place between the claws 58.

If the hydraulic pressure in the chamber 72 is further increased in the form-locking position of the actuating member 30, the first disks 40 and the second disks 42 of the multi-disk clutch 44 are moved firstly as far as to an axial stop ring 74 (FIG. 11) and then are axially compressed. At that moment, the actuating member 30 has assumed its axial coupled position in which the multi-disk clutch 44 is closed and the first disks 40 are coupled to the first gearbox component 32 in the circumferential direction via a form-locking connection.

In this coupled position, the chamber 72 can be acted upon now with the full hydraulic pressure to effect a speed harmonization between the first gearbox component 32 and the second gearbox component 34 or transmit a desired torque.

With a decreasing hydraulic pressures in the chamber 72, the tensioned spring element 60 is able to return the disks 40, 42 in axial direction, i.e. according to FIG. 11 move them to the right, in which process the first disks 40 are uncoupled from the clutch disk 46 in the circumferential direction. As soon as the actuating member 30 again reaches its non-actuated, axial initial position, all frictional elements of the gear shift device 26 can separate or get released from one another within the existing axial clearances.

Figure 12:
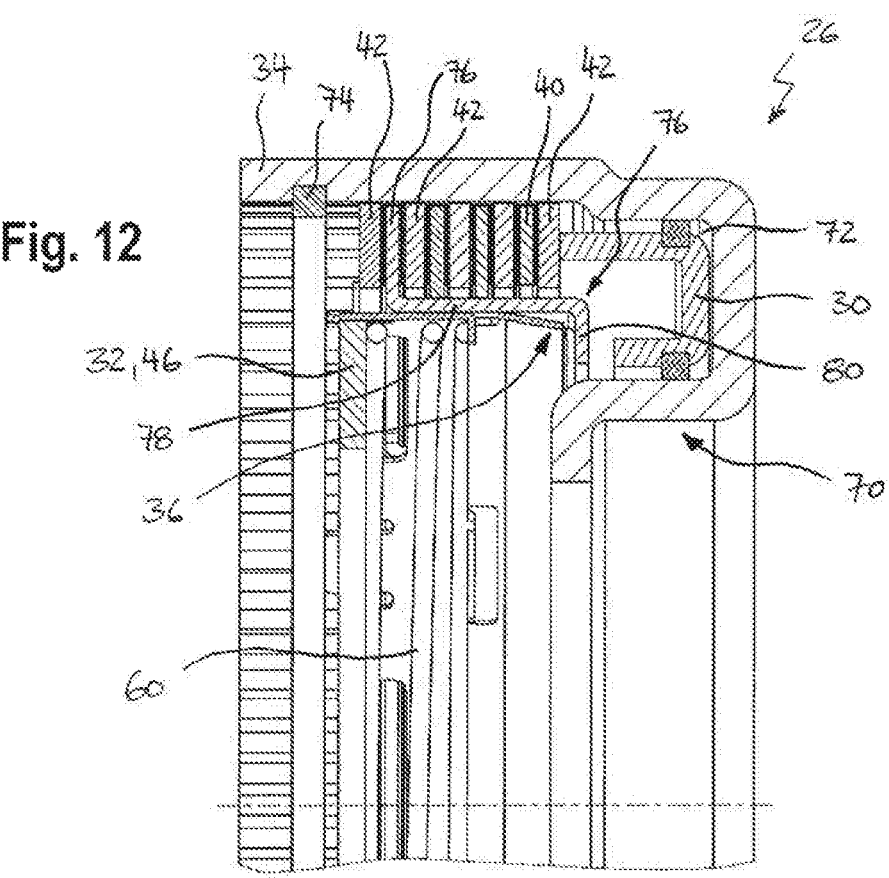
FIG. 12 shows a longitudinal section through a further embodiment of the gear shift device according to the invention in a non-actuated initial position.
Figure 13:
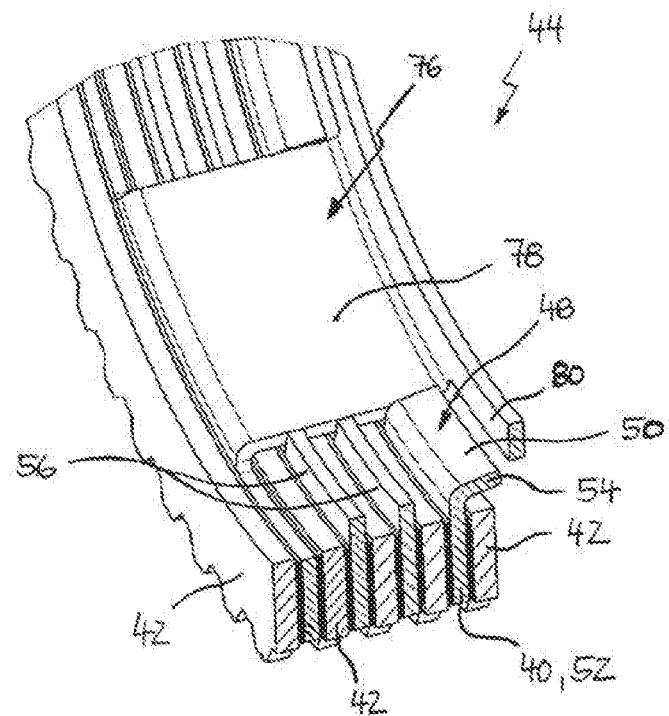
FIG. 13 is a detail section of the gear shift device according to FIG. 12 in the area of the multi-disk clutch.
Figure 14:
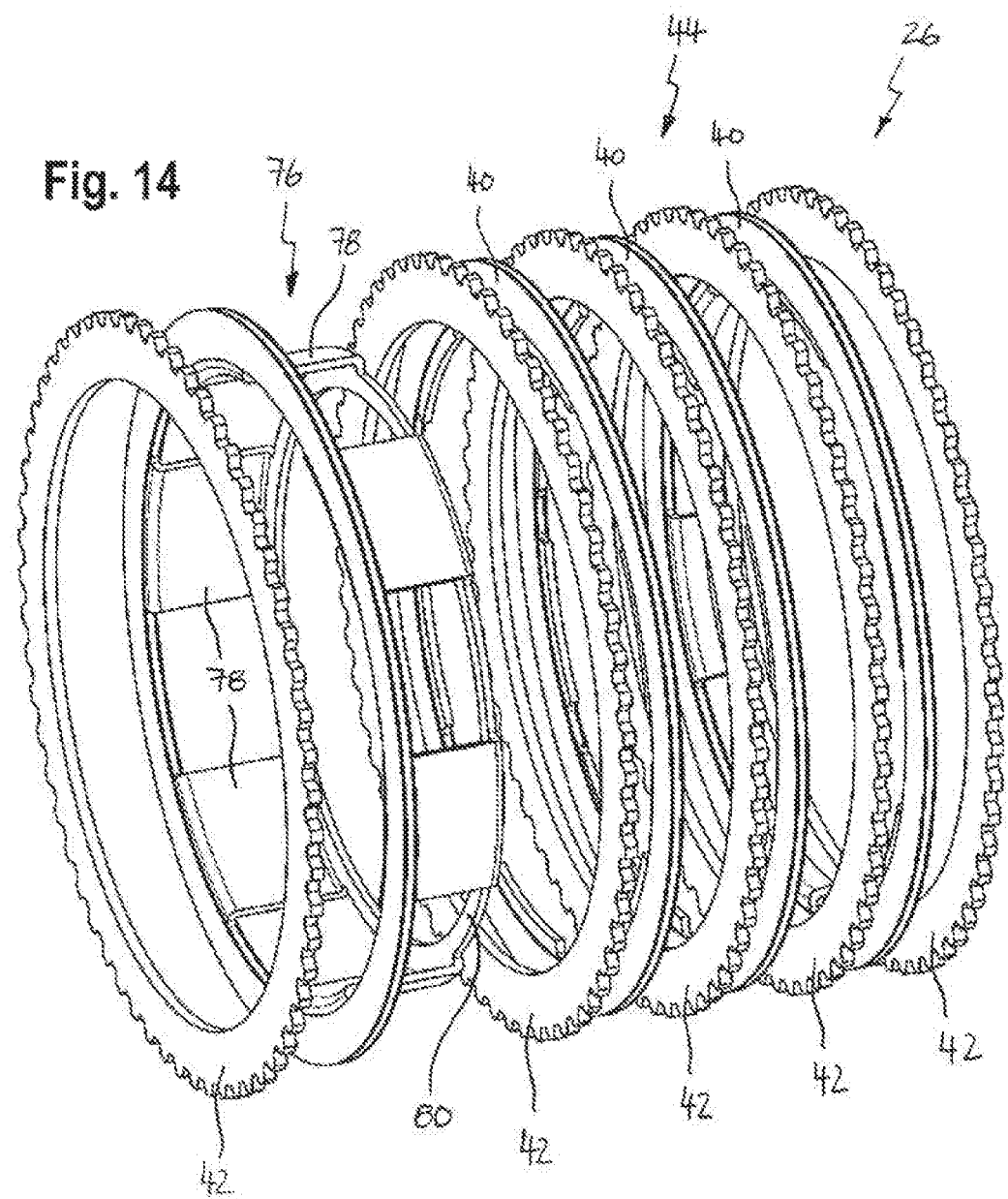
FIG. 14 is a perspective exploded view of the gear shift device according to FIG. 12.

FIGS. 12 to 14 show a further embodiment of the gear shift device 26, which differs from the embodiment according to FIGS. 2 to 11 merely in terms of the coupling operation of the first disks 40 in the circumferential direction.

According to FIGS. 12 to 14, one of the first disks 40 forms a disk support 76 which couples all first disks 40 in the circumferential direction in a form-locking manner.

It can be seen on the basis of FIGS. 12 and 13 that in the present case the first disk 40 which is axially farthest from the actuating member 30 is designed as a disk support 76 for a rotationally fixed form-fitting interconnection of all first disks 40.

According to FIG. 14, the first disk 40 designed as a disk support 76 comprises a ring-shaped disk plate which extends in a plane perpendicular to the gearbox axis A, with a radially inner edge of the disk plate having coupling lugs 78 formed thereon which are spaced in the circumferential direction and are axially bent, said coupling lugs at an end facing away from the disk plate being connected to one another by a stabilization ring 80 integrally formed thereon. The first disk 40 is a pure stamped and bent part.

This is why the coupling protrusions 56 of the first disks 40, which are arranged axially between the synchronization disk 52 and the first disk 40 which is axially farthest from the actuating member 30, may have a simplified design compared to the embodiment according to FIGS. 2 to 11. Thus, the coupling protrusions 56 of said first disks 40 according to FIG. 13 are not axially deformed any more, but are merely designed as protrusions which extend radially inward.

Due to the coupling protrusions 56, axially fitted into each other, of two neighboring first disks 40 according to FIGS. 9 and 10, the occurring frictional moments are transferred in each case from a first disk 40 to the next first disk 40. In this way, the frictional moments will add up at the first disk 40 which is axially farthest from the actuating member 30, so that their freely projecting coupling protrusions 56 are under high load. Compared with this, the coupling lugs 78 of the first disk 40 realized as a disk support 76 do not freely project in axial direction, but are connected to one another by the stabilization ring 80. This basket-like closed shape of the disk support 76 results in a particularly high load bearing capacity of the coupling lugs 78.

In analogy to the embodiment according to FIGS. 2 to 11, the coupling lugs 78 engage between the claws 58 of the clutch disk 46 in the form-locking position and the coupled position of the actuating member 30 for establishing a rotationally fixed form-locking connection between the first disks 40 and the first gearbox component 32.

Figure 15:
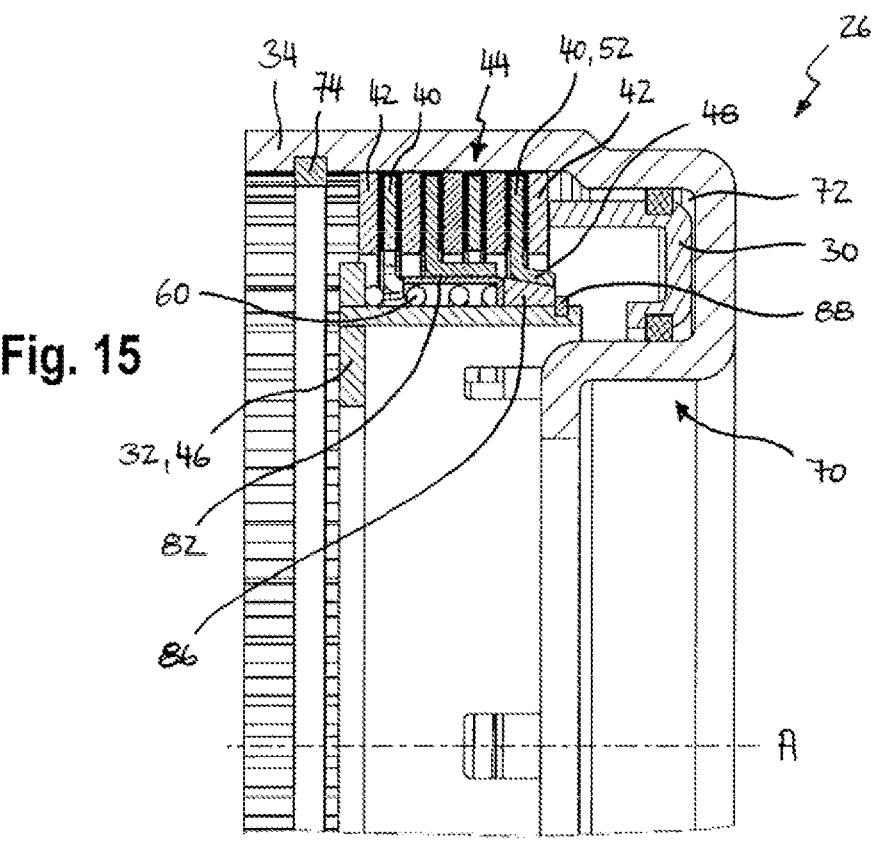
FIG. 15 shows a longitudinal section through a further embodiment of the gear shift device according to the invention in a non-actuated initial position.
Figure 16:
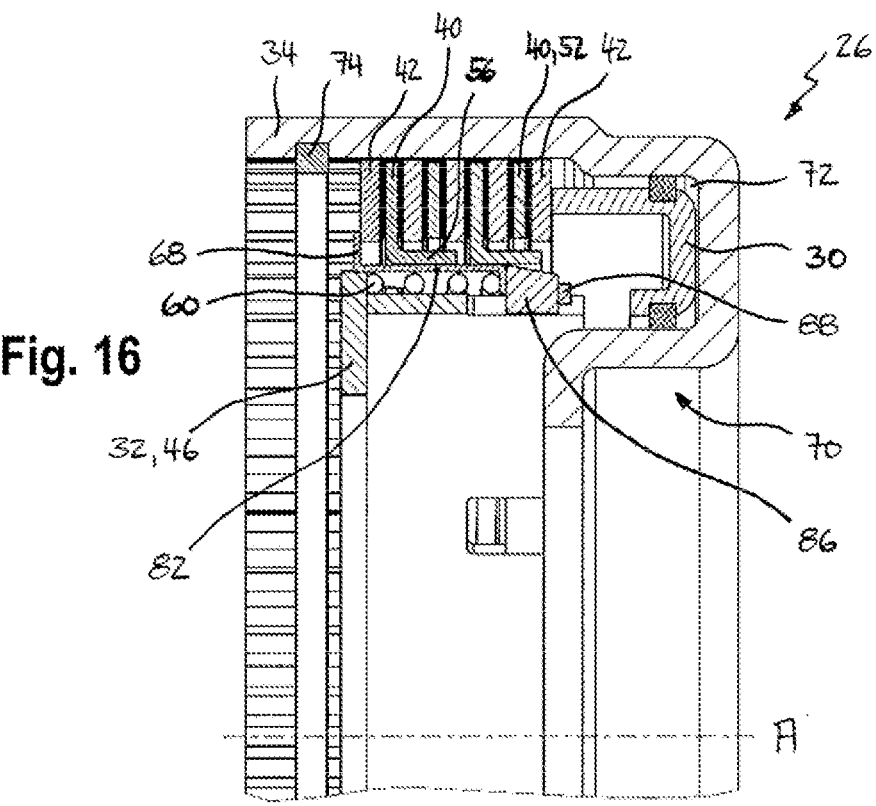
FIG. 16 shows a further longitudinal section through the gear shift device according to FIG. 15.

FIGS. 15 to 17 show a further embodiment of the gear shift device 26, which differs from the embodiment according to FIGS. 2 to 11 only in terms of the constructional design of the pre-mounted structural unit 63.

Figure 7:
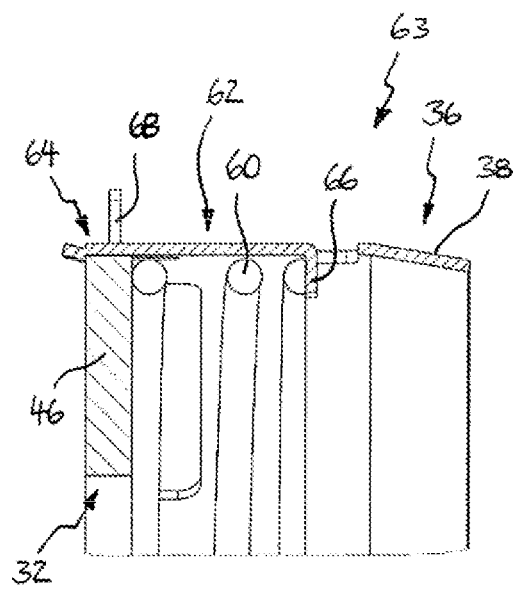
FIG. 7 shows a detail section through a pre-mounted structural unit of the gear shift device according to FIG. 2.

Here, the complex sheet metal sleeve 62 according to FIGS. 7 and 8 have been replaced by a multi-part assembly unit comprising a sheet metal sleeve 82, a bearing bush 84, a separate friction ring 86 as well as a snap ring 88.

The bearing bush 84 is firmly connected to the first gearbox component 32 in the axial direction, for instance is press-fitted with it. The sheet metal sleeve 82, the spring element 60 and the friction ring 86 are axially slipped onto the bearing bush 84 and locked by the snap ring 88 in an axially preloaded position. By means of a form-locking connection, the friction ring 86 is connected to the bearing bush 84 and the first gearbox component 32 in a rotationally fixed manner and so as to be axially movable to a limited extent. In analogy to the sheet metal sleeve 62 according to FIGS. 7 and 8, also the sheet metal sleeve 82 according to FIGS. 15 to 17 forms a rotationally fixed form-locking connection with the first gearbox component 32 via the sheet metal lugs 68 in all axial positions of the actuating member 30.

The way of functioning of the gear shift device 26 according to FIGS. 15 to 17 is the same as that of the embodiment according to FIGS. 2 to 11.

FIGS. 18 to 23 show a further embodiment of the gear shift device 26, with the first disks 40 in contrast to the previously described embodiments being designed as outer disks and the second disks 42 correspondingly as inner disks.

Here, the first gearbox component 32 is a clutch disk 90 which is connected to the gearbox housing 16 in a rotationally fixed manner. The second gearbox component 34 is designed as an inner disk support and firmly connected to a gearbox shaft 24 of the stepped transmission 10.

Figure 21:
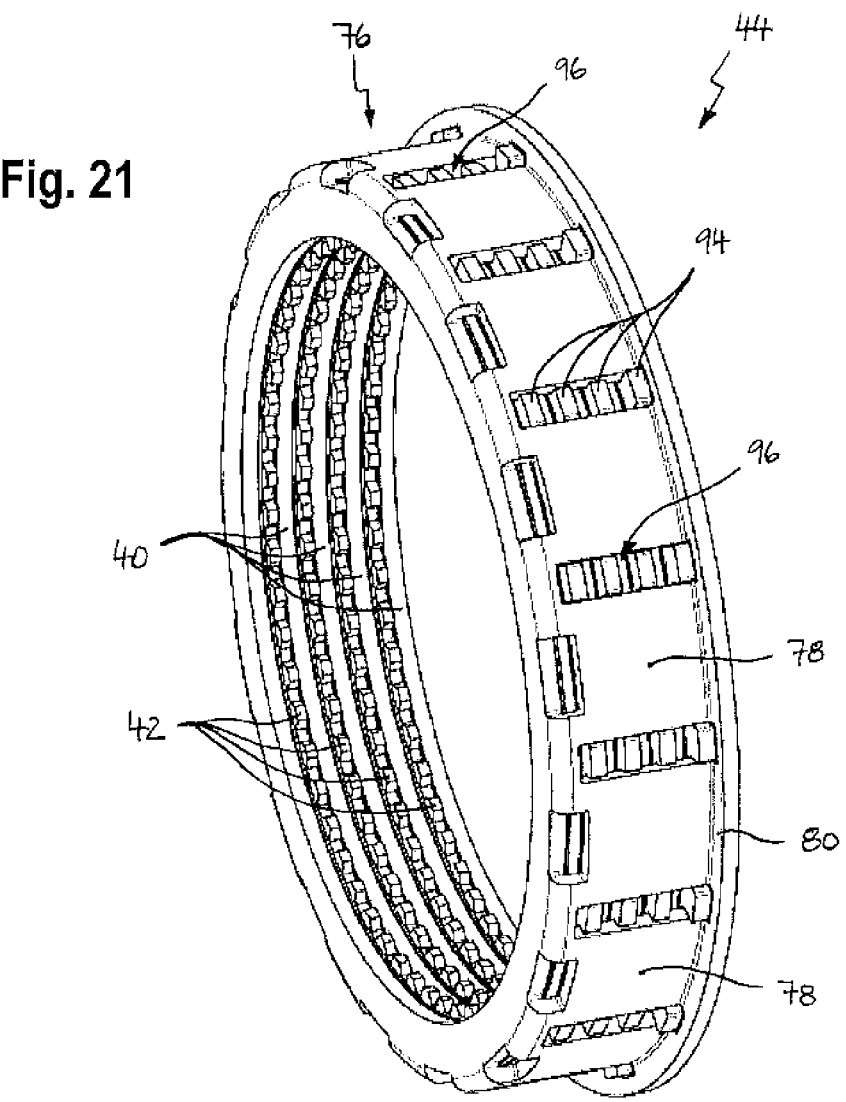
FIG. 21 is a perspective view of a multi-disk clutch of the gear shift device according to FIG. 18.
Figure 22:
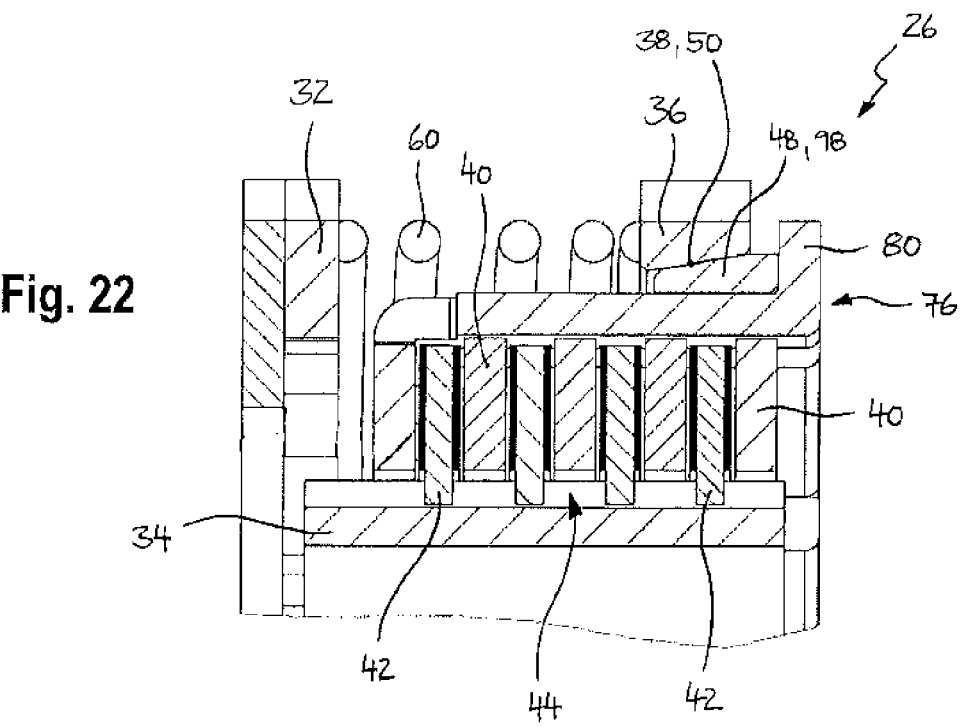
FIG. 22 shows a sectional detail of the gear shift device according to FIG. 19.
Figure 23:
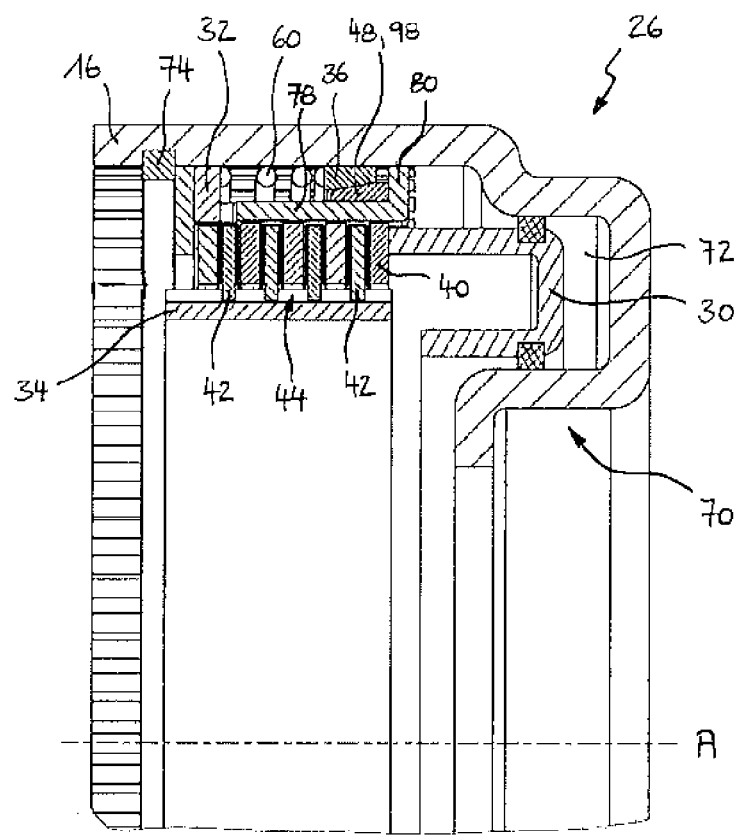
FIG. 23 shows a longitudinal section through the assembled gear shift device according to FIG. 19 in a coupled position.

In analogy to the embodiment according to FIGS. 12 to 14, one of the first disks 40, in particular the first disk 40 which is axially farthest from the actuating member 30, is designed as a disk support 76 coupling all first disks 40 in the circumferential direction in a form-locking manner (FIG. 21).

The rotationally fixed form-fitting interconnection between the first disks 40 and the disk support 76 is effected by entrainment cams 94 provided on the first disks 40 and projecting radially outwards, said cams in the circumferential direction engaging with an exact fit in corresponding recesses 96 of the disk support 76.

It is noticeable in FIGS. 18, 20 and 21 that the entrainment cams 94 of the first disk 40 which is arranged to be axially closest to the actuating member 30 protrude further outward in radial direction than the entrainment cams 94 of the other first disks 40. Specifically, the entrainment cams 94 of the first disk 40 which is arranged to be axially closest to the actuating member 30 protrude beyond a radial outer side of the coupling lugs 78 of the disk support 76.

The synchronization element 48 of the gear shift device 26 according to FIGS. 18 to 23 is a separate synchronizer ring 98 which is urged in the axial direction against the first disk 40 arranged to be axially closest to the actuating member 30 and rests against the radially protruding entrainment cams 94 of said first disk 40.

According to FIG. 18, the synchronizer ring 98 comprises axial coupling protrusions 100 for achieving a rotationally fixed coupling with the first disk 40 which is arranged to be axially closest to the actuating member 30, which engage in corresponding recesses 102 between the entrainment cams 94 of said first disk 40.

The way of functioning of the embodiment explained at the outset can be analogously transferred to the gear shift device 26 according to FIGS. 18 to 23, in this respect explicitly referring to the corresponding description relating to FIGS. 2 to 11.

The invention claimed is:

1. A gear shift device for a motor vehicle transmission, comprising
    a first gearbox component and a second gearbox component which are rotatable relative to each other around a gearbox axis,
    a friction ring which is connected to the first gearbox component so as to be rotationally fixed therewith in a circumferential direction and axially displaceable thereto and comprises a conical frictional surface,
    a plurality of first disks which are connected to one another so as to be rotationally fixed in the circumferential direction and axially displaceable relative to one another,
    a disk support coupling all of the first disks in the circumferential direction in a form-locking manner, and
    a plurality of second disks which are connected to one another so as to be rotationally fixed in the circumferential direction and axially displaceable relative to one another and are connected to the second gearbox component,
    the first and second disks being alternately arranged one behind the other and forming a multi-disk clutch,
    the first disks being coupled to a synchronization element in a rotationally fixed manner, the synchronization element comprising, axially adjoining the conical frictional surface of the friction ring, a conical mating surface for speed synchronization between the first gearbox component and the first disks.

2. The gear shift device according to claim 1, wherein the first gearbox component forms a gearbox shaft capable of rotating around the gearbox axis or is firmly connected to such gearbox shaft, and wherein the second gearbox component forms a further gearbox shaft capable of rotating around the gearbox axis or is firmly connected to such further gearbox shaft.

3. The gear shift device according to claim 1, wherein one of the first gearbox component and the second gearbox component forms a gearbox shaft capable of rotating around the gearbox axis or is firmly connected to such gearbox shaft, and wherein the other one of the first gearbox component and the second gearbox component forms a rotationally fixed gearbox housing or is firmly connected to such gearbox housing.

4. The gear shift device according to claim 1, wherein a synchronization disk comprises a ring-shaped disk plate as well as frictional protrusions which are spaced in the circumferential direction, each frictional protrusion forming the synchronization element having a conical mating surface and being formed on a radial edge of the disk plate.

5. The gear shift device according to claim 1, wherein the synchronization element is a separate synchronizer ring which is axially urged against one of the first disks and rests against it.

6. The gear shift device according to claim 5, wherein the synchronizer ring comprises axial coupling protrusions which are provided for a rotationally fixed coupling with the first disk and engage in corresponding recesses of the first disk.

7. The gear shift device according to claim 1, wherein an actuating member is provided for axially acting upon the first and second disks, the actuating member being axially movable starting from a non-actuated initial position via a synchronization position and a form-locking position toward a coupled position, the multi-disk clutch being opened and the first disks being not coupled in the circumferential direction with the first gearbox component in the non-actuated initial position, the multi-disk clutch being substantially opened and the first disks being coupled in the circumferential direction via a frictional connection with the first gearbox component in the synchronization position, the multi-disk clutch being substantially opened and the first disks being coupled in the circumferential direction via a form-locking connection with the first gearbox component in the form-locking position, and the multi-disk clutch being closed and the first disks being coupled in the circumferential direction via a form-locking connection with the first gearbox component in the coupled position.

8. The gear shift device according to claim 7, wherein a synchronization disk is the one of the first disks which is arranged to be axially closest to the actuating member.

9. The gear shift device according to claim 7, wherein the first disk which is axially furthest from the actuating member is configured as the disk support for a rotationally fixed form-fitting interconnection of all first disks.

10. The gear shift device according to claim 9, wherein the first disk configured as the disk support comprises a ring-shaped disk plate, a radial edge of the disk plate having coupling lugs formed thereon which are spaced in the circumferential direction and are axially bent, said coupling lugs being connected to one another by a stabilization ring at an end facing away from the disk plate.

11. The gear shift device according to claim 1, wherein a spring element is provided which urges the conical frictional surface of the friction ring axially toward the conical mating surface of the synchronization element.

12. The gear shift device according to claim 11, wherein the spring element is supported by the first gearbox component as well as by bent spring mounting lugs of a sheet metal sleeve.

13. The gear shift device according to claim 1, wherein the synchronization element is not integrally formed with one of the first disks.

* * * * *